(12) United States Patent
Yu et al.

(10) Patent No.: US 11,172,654 B2
(45) Date of Patent: Nov. 16, 2021

(54) AQUARIUM

(71) Applicant: GUANGDONG BOYU GROUP CO., LTD, Chaozhou (CN)

(72) Inventors: Youkai Yu, Chaozhou (CN); Bingyan Yu, Chaozhou (CN); Jianqin Yu, Chaozhou (CN)

(73) Assignee: GUANGDONG BOYU GROUP CO., LTD, Chaozhou (CN)

( * ) Notice: Subject to any disclaimer, the term of this patent is extended or adjusted under 35 U.S.C. 154(b) by 269 days.

(21) Appl. No.: 16/364,501

(22) Filed: Mar. 26, 2019

(65) Prior Publication Data

US 2019/0289833 A1   Sep. 26, 2019

(30) Foreign Application Priority Data

Mar. 26, 2018 (CN) .......................... 201820411101.1

(51) Int. Cl.
*H01F 38/14* (2006.01)
*A01K 63/00* (2017.01)
*H02J 50/10* (2016.01)
*A01K 63/06* (2006.01)

(52) U.S. Cl.
CPC ............ *A01K 63/003* (2013.01); *A01K 63/06* (2013.01); *H01F 38/14* (2013.01); *H02J 50/10* (2016.02)

(58) Field of Classification Search
CPC ...... A01K 63/003; A01K 63/06; H01F 38/14; H02J 50/10; H02K 21/00
See application file for complete search history.

(56) References Cited

U.S. PATENT DOCUMENTS

| 2019/0239490 A1* | 8/2019 | Yu | ......................... A01K 63/045 |
| 2019/0239491 A1* | 8/2019 | Yu | ............................ H02K 1/27 |
| 2019/0245419 A1* | 8/2019 | Yu | ........................... H02K 1/143 |

FOREIGN PATENT DOCUMENTS

| CN | 101179222 | * | 5/2008 |
| CN | 201336867 | * | 11/2009 |

* cited by examiner

*Primary Examiner* — Nghia M Doan
(74) *Attorney, Agent, or Firm* — McNees Wallace & Nurick LLC (57) ABSTRACT

Provided is an aquarium that includes a tank, a magnetic induction driving module, a magnetic induction power generation module, and an electric device disposed in the tank. The magnetic induction driving module is disposed outside the tank. The magnetic induction power generation module is disposed inside the tank adjacent to the magnetic induction driving module. The magnetic induction driving module is coupled to an external power source. The magnetic induction power generation module includes a magnetic induction generator, which includes a rotor assembly and a power generation induction coil which is wound around an exterior of the rotor assembly and which is coupled to the electric device. When the magnetic induction driving module is powered on, the rotor assembly is operative to rotate relative to the power generation induction coil, enabling the power generation induction coil to generate an induced current to power up the electric device.

19 Claims, 6 Drawing Sheets

AQUARIUM

CROSS-REFERENCES TO RELATED APPLICATIONS

This application claims the priority of Chinese Patent Application No. 201820411101.1 filed on Mar. 26, 2018, disclosure of which is incorporated herein by reference in its entirety.

TECHNICAL FIELD

The disclosure relates to the technical field of aquarium devices, and more particularly relates to an aquarium.

BACKGROUND

The progress of the times provides people with more and more space for leisure activities. Keeping pets has become a way of entertainment as well as releasing stress. One way of keeping pets is to keep a fish or other pets in an aquarium, and thus the aquarium has become an indispensable piece of furniture or decoration in a home or working environment.

Nowadays, a variety of internal devices such as a water pump, a fixture, a filter, and the like are usually arranged in a current aquarium, and the internal devices are typically configured to be coupled to an external power source through power supply wires directly introduced into the inside of the tank. When such power supply mode is adopted for the internal devices, the following defects exist. First is potential safety hazards of electric leakage that can be brought about by the internal devices unless powered up by a low safety voltage. Second, it would be made extremely inconvenient to move, clean and maintain the aquarium when the power supply wires are directly introduced from outside the tank into the inside of the tank for connection to the various devices. That is, the internal devices and the power supply connections need to be firstly removed before the aquarium is able to be moved. The operation is quite complicated bringing people great inconvenience.

In view of the above problems, there is urgent need for an aquarium that can provide high safety and convenience for power supply connection, so as to facilitate the movement, cleaning and maintenance of the aquarium.

SUMMARY

An object of the present disclosure is to provide an aquarium, where power supply power lead is not needed to be introduced into the tank to supply power to an electric device.

Another object of the present disclosure is to provide an aquarium. The electrical connection of the electric device may be automatically disconnected when the electric device is removed from the aquarium.

To achieve the objects, the present disclosure provides the solutions described below.

An aquarium is provided and includes a tank, a magnetic induction driving module, a magnetic induction power generation module and an electric device disposed in the tank, where the magnetic induction driving module is disposed outside the tank adjacent to a tank wall of the tank, the magnetic induction power generation module is disposed inside the tank adjacent to the magnetic induction driving module, the magnetic induction driving module is configured to be coupled to an external power source, the magnetic induction power generation module includes a magnetic induction generator, which includes a rotor assembly and a power generation induction coil wound around an exterior of the rotor assembly, the power generation induction coil is coupled to the electric device, and when the magnetic induction driving module is powered on, the rotor assembly is operative to rotate relative to the power generation induction coil, enabling the power generation induction coil to generate an induced current to power up the electric device.

In a typical solution for the aquarium, the magnetic induction driving module includes a magnetic core and a coil winding, the magnetic core includes a first magnetic column, the coil winding is wound around the first magnetic column, and the rotor assembly includes a permanent magnet rotor and a rotating shaft that is disposed at a axis of the permanent magnet rotor and that runs parallel to an endface of the magnetic induction driving module adjacent to the tank.

As a typical solution for the aquarium, the magnetic core further includes a magnetic base plate wherein a non-end position of the magnetic base plate is connected to one end of the first magnetic column that faces away from the tank.

As a typical solution for the aquarium, the magnetic core further includes at least one second magnetic column connected to one end of the magnetic base plate, the first magnetic column and the second magnetic column are spaced apart and disposed on a same side of the magnetic base plate, the magnetic induction driving module further includes a first reel insertively fitted with the first magnetic column, and a sidewall of the first reel is arranged between the first magnetic column and the second magnetic column.

As a typical solution for the aquarium, the rotor assembly is disposed between the first magnetic column and the second magnetic column, and disposed outside the magnetic core and adjacent to an endface of the magnetic core.

As a typical solution for the aquarium, the magnetic induction driving module is disposed outside a base wall of the tank, and the magnetic induction power generation module is disposed on an inner side of the base wall of the tank.

As a typical solution for the aquarium, the aquarium further includes a base seat to which the magnetic induction driving module is fixed and onto which the tank is detachably mounted.

As a typical solution for the aquarium, the magnetic induction power generation module further includes a mounting box in which the magnetic induction generator is detachably mounted, and a lead wire of the power generation induction coil passes through the mounting box to be coupled the electric device.

As a typical solution for the aquarium, a limiting groove configured for placing the mounting box is concavely defined in an inner side of the base wall of the tank, and the limiting groove is disposed at a position corresponding to that of the magnetic induction driving module.

As a typical solution for the aquarium, the electric device includes a lighting fixture disposed on the base wall of the tank adjacent to the magnetic induction power generation module.

This disclosure has the following beneficial effects. When an alternating current is input to the coil winding of the stator of the water pump, an alternating magnetic field is generated so that the permanent magnet rotor rotates. Then the magnetic field lines produced as the permanent magnet rotor is rotating cuts the power generation induction coil disposed outside the permanent magnet rotor. Thus, the power generation induction coil would generate an induced current that will be supplied to the electric device (low-power device). This facilitates the power on/off operation of the electric device, and can avoid the safety hazard such as electric leakage that may occur when a power supply device is individually used to power up the electric device in the tank.

10. Tank; 20. Magnetic Induction Diving Module; 21. Magnetic Core; 211. First Magnetic Column; 212. Magnetic Base Plate; 213. Second Magnetic Column; 22. Coil Winding; 23. First Reel; 30. Magnetic Induction Power Generation Module; 31. Magnetic Induction Generator; 311. Power Generation Induction Coil; 312. Permanent Magnet Rotor; 313. Shaft; 314. Second Reel; 32. Mounting Box; 321. Box Body; 322. Cover Body; 323. Positioning Column; 40. Base Seat; 50. Lighting Fixture.

DETAILED DESCRIPTION

Solutions of the present disclosure will be described in further detail below through embodiments in conjunction with the drawings.

In the description of the present disclosure, it should be understood that the orientational or positional relationships indicated by terms "inside", "outside" and the like are based on the orientational or positional relationships illustrated in the drawings, which are for the mere purpose of facilitating and simplifying description of the present disclosure, and these relationships do not indicate or imply that the apparatus or element referred to has a specific orientation and is constructed and operated in a specific orientation, and thus it is not to be construed as limiting the present disclosure.

Furthermore, terms like "first" and "second" are merely for description and are not to be construed as indicating or implying relative importance or implicitly indicating the number of technical features as indicated. Thus, a feature defined as a "first" feature or a "second" feature may explicitly or implicitly include one or more of such a feature.

Unless otherwise expressly specified and defined, the term "fixed" is to be construed in a broad sense, for example, it is to be interpreted as permanently coupled, detachably coupled, or integrated; mechanically coupled or electrically coupled; directly coupled to each other or indirectly coupled to each other via an intermediary; or internally coupled or interactional between two components. For those of ordinary skill in the art, specific meanings of the above terms in the present disclosure can be understood depending on specific contexts.

In the present disclosure, unless otherwise expressly specified and defined, when a first feature is described as "on" or "under" a second feature, the first feature and the second feature may be in direct contact, or be in contact via another feature disposed between these two features. Moreover, when the first feature is described as "on" the second feature, the first feature may be situated directly on or obliquely on the second feature, or the first feature may merely be located at a higher level than the second feature. When the first feature is described as "under" the second feature, the first feature may be situated directly under or obliquely under the second feature, or the first feature may merely be located at a lower level than the second feature.

As illustrated in FIGS. 1 to 7, embodiments of the present disclosure provide an aquarium. The aquarium includes a tank 10, a magnetic induction driving module 20, a magnetic induction power generation module 30, and an electric device disposed in the tank 10. The magnetic induction driving module 20 is disposed outside the tank 10 adjacent to a tank wall of the tank 10. The magnetic induction power generation module 30 is disposed in the tank 10 adjacent to the magnetic induction driving module 20. The magnetic induction driving module 20 is configured to be coupled to an external power source. The magnetic induction power generation module 30 includes a magnetic induction generator 31, which includes a rotor assembly and a power generation induction coil 311 wound around an exterior of the rotor assembly, and the power generation induction coil 311 is connected to the electric device. When the magnetic induction driving module 20 is powered on, the rotor assembly rotates relative to the power generation induction coil 311, enabling the power generation induction coil 311 to generate an induced current to power up the electric device. Since the magnetic induction driving module 20 is directly connected to the external power source and after the external power source inputs the electrical energy to the magnetic induction driving module 20, the generated alternating magnetic field drives the rotor assembly to rotate, so that the power generation induction coil 311 generates an induced current that is supplied to the electric device. Specifically, the electric device is a low power (less than 5 w) electric device, and experiments have proved that it is fully feasible to supply power to these low-power electric devices with the power supply mode in accordance with the embodiment. Compared with the related art, the electric device can be safely powered with the power supply mode of the embodiment, and when the electrical connection of the electric device needs to be cut off, only the tank 10 needs to be moved so as to be separated from the magnetic induction driving module 20 outside the tank 10. Thus, tank 10 can be conveniently and rapidly moved.

Figure 1:
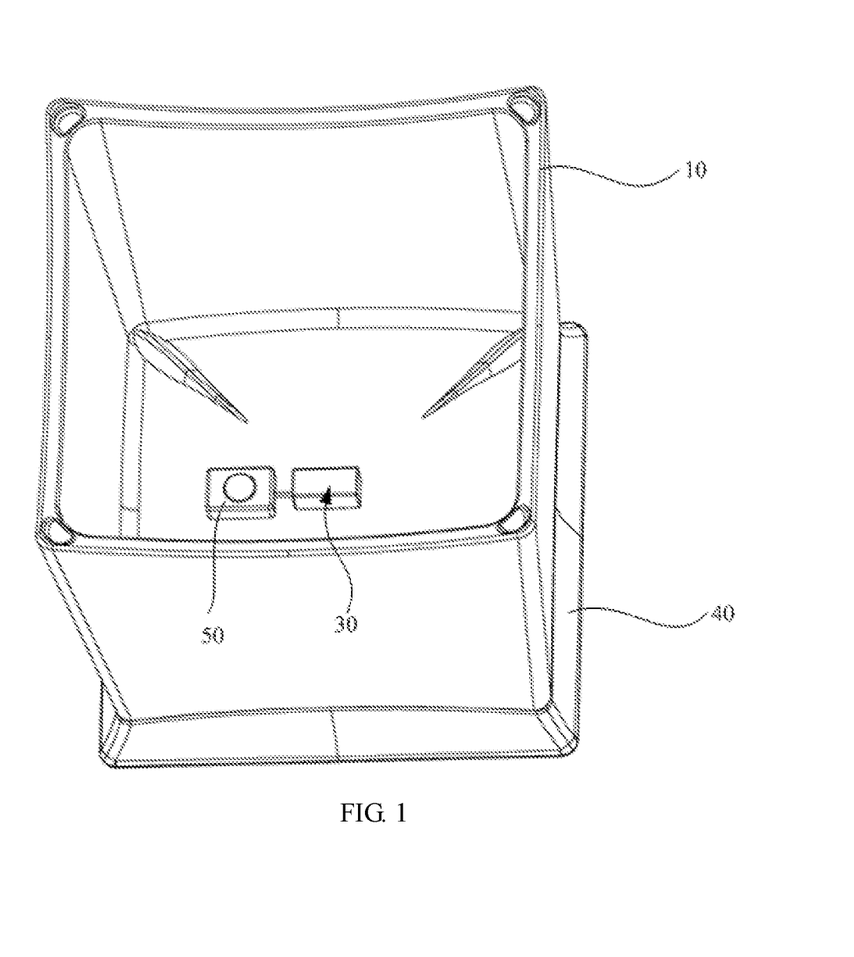
FIG. 1 is a perspective view of an aquarium according to an embodiment of the present disclosure.
Figure 2:
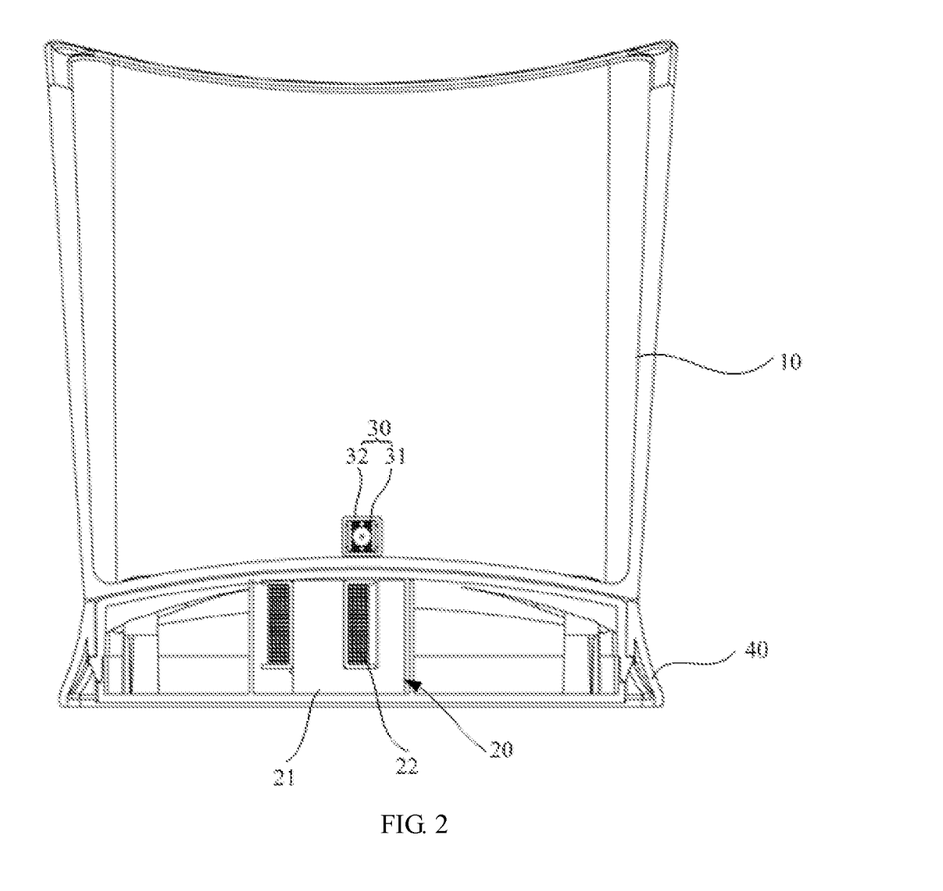
FIG. 2 is a cross-sectional view of a first perspective of the aquarium according to the embodiment of the present disclosure.
Figure 3:
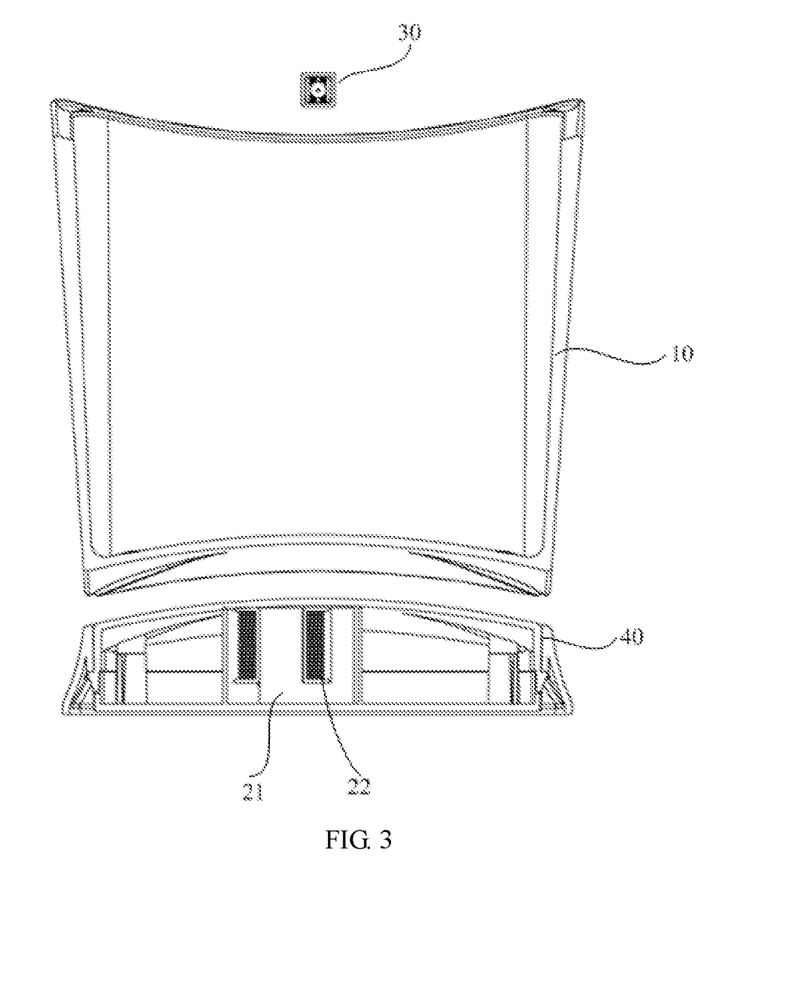
FIG. 3 is an exploded cross-sectional view of a first perspective of the aquarium according to the embodiment of the present disclosure.
Figure 4:
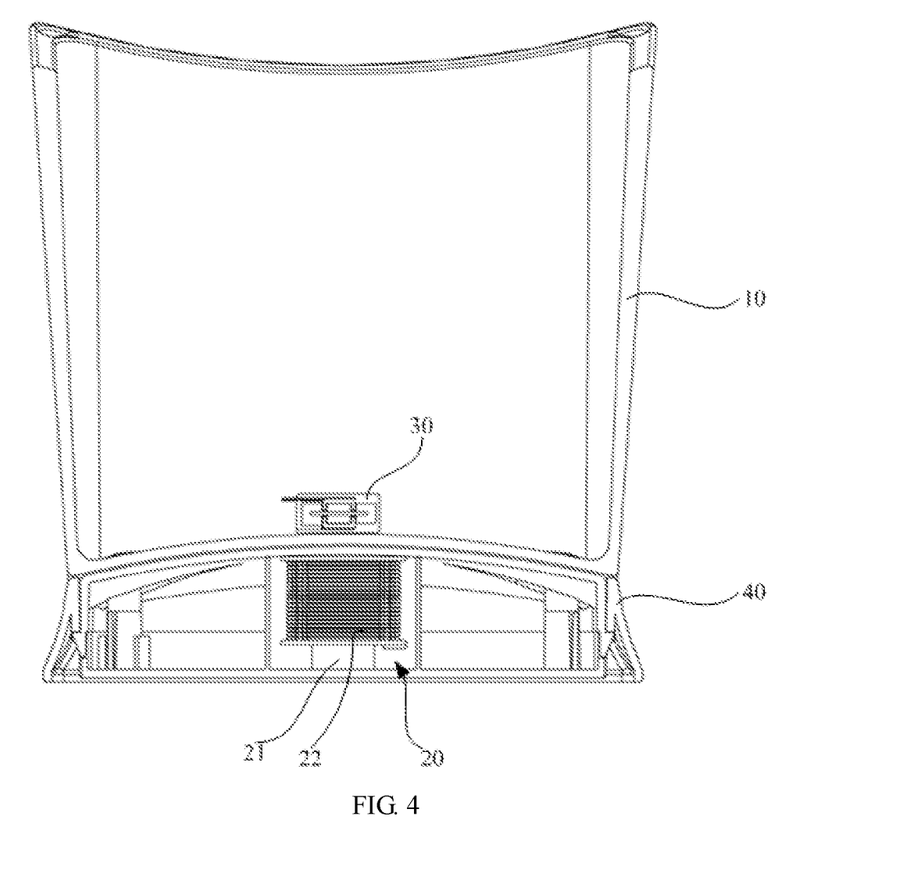
FIG. 4 is a cross-sectional view of a second perspective of the aquarium according to the embodiment of the present disclosure.

Specifically, as illustrated in FIGS. 2 to 4, the magnetic induction driving module 20 may be directly disposed on an outer wall of the tank 10, so that the magnetic induction power generation module 30 may be in close contact with the magnetic induction driving module 20. Thus, the power supply stability and efficiency are improved.

Typically, in order to facilitate the mounting of the magnetic induction power generation module 30, the magnetic induction driving module 20 is disposed outside a base wall of the tank 10, and the magnetic induction power generation module 30 is disposed inside the base wall of the tank 10 as long as the magnetic induction power generation module 30 is arranged above the magnetic induction driving module 20.

Further, the aquarium of the embodiment further includes a base seat 40 disposed at the bottom of the tank 10. The magnetic induction driving module 20 is fixed to the base seat 40. The magnetic induction driving module 20 directly faces the magnetic induction power generation module 30 when the tank 10 is mounted on the base seat 40. Otherwise, the magnetic induction power generation module 30 moves away from the magnetic induction driving module 20 when the tank 10 is separated from the base seat 40. At this time, the electrical connection of the electric device is disconnected. Therefore, the arrangement of the 20 and the magnetic induction power generation module 30 simplifies the electrical connection of the electrical equipment.

Specifically, a mounting groove is arranged on one side of the base seat 40 facing away from the tank 10, and the magnetic induction driving module 20 is mounted in the mounting groove, to facilitate positioning and mounting of the magnetic induction driving module 20. The magnetic induction driving module 20 is arranged in the mounting groove, and then potted and fixed in the mounting groove by using an electrically insulating material such as epoxy resin.

Figure 5:
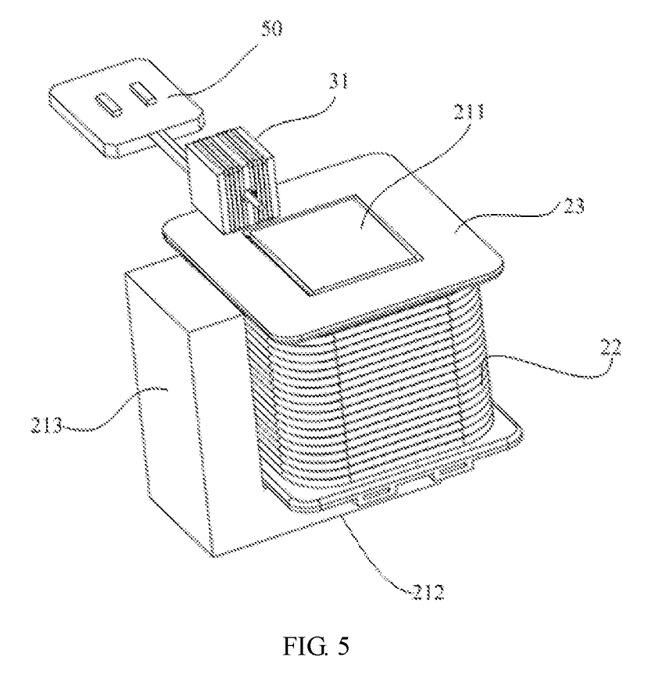
FIG. 5 is a schematic diagram showing connection of a magnetic induction driving module, a magnetic induction generator and a lighting fixture according to the embodiment of the present disclosure.

In this embodiment, as illustrated in FIG. 5, the magnetic induction driving module 20 includes a magnetic core 21 and a coil winding 22. The magnetic core 21 includes a first magnetic column 211, and the coil winding 22 is wound around the first magnetic column 211. The rotor assembly includes a permanent magnet rotor 312 and a rotating shaft 313 that is disposed at an axis of the permanent magnet rotor 312 and that runs parallel to an endface of the magnetic induction driving module 20 adjacent to the tank 10. Thus, the distance between the permanent magnet rotor 312 and the magnetic induction driving module 20 can be shortened, and the power generation efficiency can be improved.

The magnetic core 21 further includes a magnetic base plate 212 where a non-end position of the magnetic base plate 212 is connected to one end of the first magnetic column 211 facing away from the tank 10. Specifically, a central position of the magnetic base plate 212 along the longitudinal direction thereof is perpendicularly connected to an end of the first magnetic column 211 facing away from the tank 10, to facilitate the mounting of the coil winding 22.

In this embodiment, the magnetic core 21 further includes at least one second magnetic column 213 connected to one end of the magnetic base plate 212. The first magnetic column 211 and the second magnetic column 213 are spaced apart and disposed on a same side of the magnetic base plate 212. The magnetic induction driving module 20 further includes a first reel 23 insertively fitted with the first magnetic column 211, and a sidewall of the first reel 23 is arranged between the first magnetic column 211 and the second magnetic column 213, so that the magnetic induction driving module 20 can be stably mounted onto the base seat 40.

The rotor assembly is disposed between the first magnetic column 211 and the second magnetic column 213, and is located outside the magnetic core 21 and adjacent to an endface of the magnetic core 21, so that the alternating magnetic field generated when the coil winding 22 is powered on totally covers the permanent magnet rotor 312, improving the power supply stability of the magnetic induction generator 31.

Figure 6:
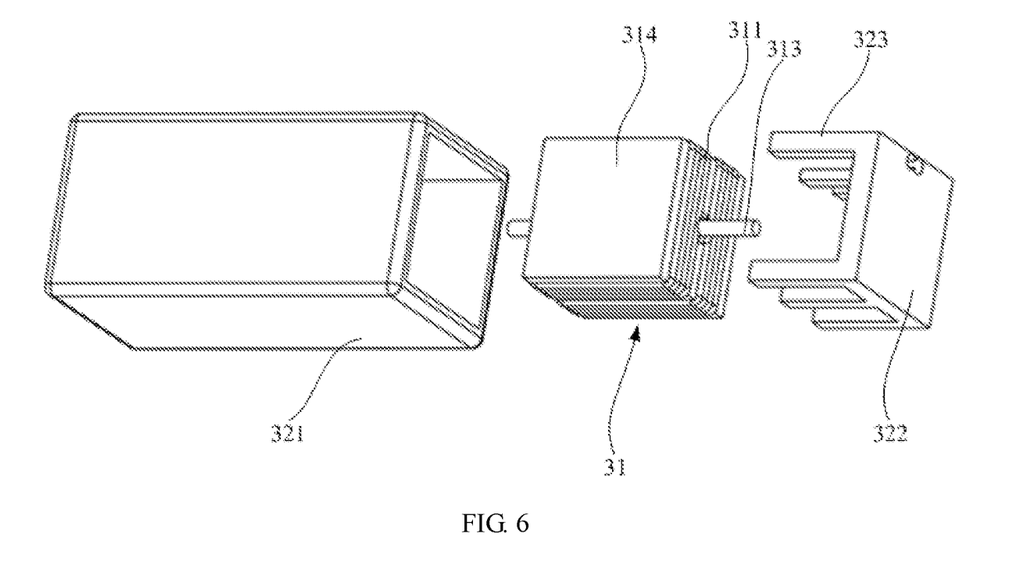
FIG. 6 is an exploded view of a magnetic induction power generation module according to the embodiment of the present disclosure.
Figure 7:
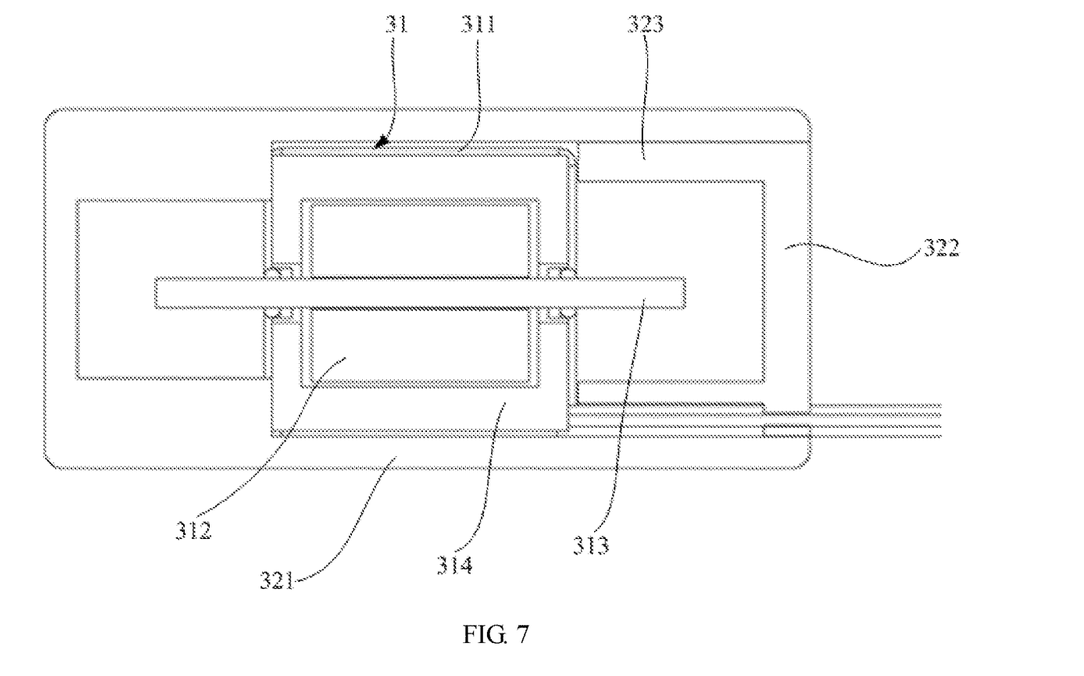
FIG. 7 is a cross-sectional view of the magnetic induction power generation module according to the embodiment of the present disclosure.

As illustrated in FIGS. 6 and 7, the magnetic induction power generation module 30 further includes a mounting box 32 in which the magnetic induction generator 31 is detachably mounted, and a lead wire of the power generation induction coil 311 passes through the mounting box 32 to be coupled to the electric device. The mounting box 32 may be directly placed at the bottom of the tank 10, or may be fixed to the bottom of the tank 10 by means of a suction cup or a mounting seat.

In this embodiment, the magnetic induction generator 31 further includes a second reel 314 disposed outside the permanent magnet rotor 312. The permanent magnet rotor 312 is clearance-fitted with the second reel 314, and the power generation induction coil 311 is wound around the second reel 314 along an axial direction of the permanent magnet rotor 312. Rotating shaft seats are respectively disposed at two ends of the second reel 314 along a longitudinal direction thereof, and the rotating shaft 313 passes through the second reel 314 to be connected to the rotating shaft seat. The power generation induction coil 311 is fixed to the permanent magnet rotor 312 through the second reel 314.

In this embodiment, the mounting box 32 includes a box body 321 having an open end and a cover body 322 that is configured to cover the open end. A positioning step is disposed on the inner wall of the box body 321 right facing the open end. Several positioning columns 323 are spaced apart on one side of the cover body 322 close to the box body 321. When the cover body 322 is closed on the open end, two sides of the second reel 314 abut the positioning step and the positioning column 323, respectively, so that the second reel 314 and the power generation induction coil 311 are fixed in the mounting box 32 enabling the rotating shaft 313 and the permanent magnet rotor 312 to rotate relative to the second reel 314 and the power generation induction coil 311, thereby enabling the power generation induction coil 311 to generate an induced current.

Further, the box body 321 is provided with a mounting hole defined adjacent to the open end and a relief hole in communication with the mounting hole. The relief hole has a smaller size than the mounting hole does, and the positioning step is formed between the relief hole and the mounting hole.

At least two positioning columns 323 are arranged at intervals on the cover body 322, a yielding area is formed between two positioning columns 323, and the magnetic induction generator 31 is mounted in the mounting hole. One end of the rotating shaft 313 extends into the relief hole, and the other end extends to the yielding area.

With the above structural design, the rotating shaft 313 can be prevented from coming into contact with components other than the rotating shaft seat, which otherwise would affect the rotation of the rotating shaft 313.

In this embodiment, however, the magnetic induction generator 31 will not be limited to being mounted at the bottom of the tank 10 through the mounting box 32, it may also be mounted in the tank 10 by directly perfusing an insulating material such as epoxy resin.

Typically, a limiting groove configured for placing the mounting box 32 may be concavely defined in an inner side of the base wall of the tank 10 and positions and mounts the magnetic induction power generation module 30. The limiting groove is disposed at a position corresponding to that of the magnetic induction driving module 20.

The electric device includes a lighting fixture 50 disposed on the base wall of the tank 10 adjacent to the magnetic induction power generation module 30. Specifically, the lighting fixture 50 is disposed on one side of the cover body 322 facing away from the box body 321. The cover body 322 is provided with a through hole for the lead wire of the power generation induction coil 311 to pass through. The lead wire of the power generation induction coil 311 passes through the through hole and then is connected to the lighting fixture 50.

Further, the lighting fixture 50 includes a light emitting diode (LED) and a sealing cover that seals the LED, so that the lighting fixture 50 has a desirable waterproof functionality. The sealing cover has a light-transmitting region for light of the LED to be transmitted through.

It should be noted that the above-mentioned embodiments are merely some illustrative embodiments in accordance with the present disclosure as well as the technical principles used therein, and that any change or substitution easily conceivable to those skilled in the art without departing from the technical scope of the present disclosure shall all fall in the scope of protection of the present disclosure.

The present disclosure is illustrated by way of the above embodiments but will not be limited to these embodiments. It should be understood by those skilled in the art that any modification, equivalent substitution, change or the like made without departing from the spirit of the present disclosure shall all falling the scope of the present disclosure. In addition, some terms used in the specification and claims of the present application are not intended for limiting and are merely for facilitating description. In addition, "one embodiment", "another embodiment" and the like described above represent different embodiments, and of course, all or part of them may be combined into one embodiment.

What is claimed is:

1. An aquarium, comprising a tank, a magnetic induction driving module, a magnetic induction power generation module, and an electric device disposed in the tank;
   wherein the magnetic induction driving module is disposed outside the tank adjacent to a tank wall of the tank, and the magnetic induction power generation module is disposed inside the tank adjacent to the magnetic induction driving module;
   wherein the magnetic induction driving module is configured to be coupled to an external power source;
   wherein the magnetic induction power generation module comprises a magnetic induction generator, which comprises a rotor assembly and a power generation induction coil wound around an exterior of the rotor assembly, the power generation induction coil is coupled to the electric device, and when the magnetic induction driving module is powered on, the rotor assembly is operative to rotate relative to the power generation induction coil, enabling the power generation induction coil to generate an induced current to power up the electric device; and
   wherein the magnetic induction driving module comprises a magnetic core and a coil winding, the magnetic core comprises a first magnetic column, the coil winding is wound around the first magnetic column, and the rotor assembly comprises a permanent magnet rotor and a rotating shaft that is disposed at an axis of the permanent magnet rotor and parallel to an endface of the magnetic induction driving module, wherein the endface of the magnetic induction driving module is adjacent to the tank and faces the tank.

2. The aquarium of claim 1, wherein the magnetic core further comprises a magnetic base plate, and wherein a non-end position of the magnetic base plate is connected to one end of the first magnetic column that faces away from the tank.

3. The aquarium of claim 2, wherein the magnetic core further comprises at least one second magnetic column connected to one end of the magnetic base plate, the first magnetic column and the second magnetic column are spaced apart and disposed on a same side of the magnetic base plate, the magnetic induction driving module further comprises a first reel insertively fitted with the first magnetic column, and a sidewall of the first reel is arranged between the first magnetic column and the second magnetic column.

4. The aquarium of claim 3, wherein the rotor assembly is disposed between the first magnetic column and the second magnetic column, and disposed outside the magnetic core and adjacent to an endface of the magnetic core.

5. The aquarium of claim 4, wherein the magnetic induction driving module is disposed outside a base wall of the tank, and the magnetic induction power generation module is disposed on an inner side of the base wall of the tank.

6. The aquarium of claim 2, wherein the magnetic induction driving module is disposed outside a base wall of the tank, and the magnetic induction power generation module is disposed on an inner side of the base wall of the tank.

7. The aquarium of claim 6, further comprising a base seat to which the magnetic induction driving module is fixed, and onto which the tank is detachably mounted.

8. The aquarium of claim 6, wherein the magnetic induction power generation module further comprises a mounting box in which the magnetic induction generator is detachably mounted, and a lead wire of the power generation induction coil passes through the mounting box to be coupled to the electric device.

9. The aquarium of claim 3, wherein the magnetic induction driving module is disposed outside a base wall of the tank, and the magnetic induction power generation module is disposed on an inner side of the base wall of the tank.

10. The aquarium of claim 9, further comprising a base seat to which the magnetic induction driving module is fixed, and onto which the tank is detachably mounted.

11. The aquarium of claim 9, wherein the magnetic induction power generation module further comprises a mounting box in which the magnetic induction generator is detachably mounted, and a lead wire of the power generation induction coil passes through the mounting box to be coupled to the electric device.

12. The aquarium of claim 1, wherein the magnetic induction driving module is disposed outside a base wall of the tank, and the magnetic induction power generation module is disposed on an inner side of the base wall of the tank.

13. The aquarium of claim 12, further comprising a base seat to which the magnetic induction driving module is fixed, and onto which the tank is detachably mounted.

14. The aquarium of claim 12, wherein the magnetic induction power generation module further comprises a mounting box in which the magnetic induction generator is detachably mounted, and a lead wire of the power generation induction coil passes through the mounting box to be coupled to the electric device.

15. The aquarium of claim 14, wherein a limiting groove configured for placing the mounting box is concavely defined in an inner side of the base wall of the tank, and the limiting groove is disposed at a position corresponding to that of the magnetic induction driving module.

16. The aquarium of claim 12, wherein the electric device comprises a lighting fixture disposed on the base wall of the tank adjacent to the magnetic induction power generation module.

17. The aquarium of claim 1, wherein the magnetic induction driving module is disposed outside a base wall of the tank, and the magnetic induction power generation module is disposed on an inner side of the base wall of the tank.

18. The aquarium of claim 17, further comprising a base seat to which the magnetic induction driving module is fixed, and onto which the tank is detachably mounted.

19. The aquarium of claim 17, wherein the magnetic induction power generation module further comprises a mounting box in which the magnetic induction generator is detachably mounted, and a lead wire of the power generation induction coil passes through the mounting box to be coupled to the electric device.

\* \* \* \* \*